(12) United States Patent
Konuki (10) Patent No.: US 9,827,908 B2
(45) Date of Patent: Nov. 28, 2017

(54) VEHICLE REARVIEW MIRROR SYSTEM, AND VEHICLE PROVIDED WITH SAID VEHICLE REARVIEW MIRROR SYSTEM

(71) Applicant: ICHIKOH INDUSTRIES, LTD., Isehara-shi, Kanagawa-ken (JP)

(72) Inventor: Isao Konuki, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 224 days.

(21) Appl. No.: 14/374,675

(22) PCT Filed: May 22, 2013

(86) PCT No.: PCT/JP2013/064179
§ 371 (c)(1),
(2) Date: Jul. 25, 2014

(87) PCT Pub. No.: WO2013/176165
PCT Pub. Date: Nov. 28, 2013

(65) Prior Publication Data
US 2014/0368657 A1 Dec. 18, 2014

(30) Foreign Application Priority Data

May 23, 2012 (JP) ................................ 2012-117457

(51) Int. Cl.
*H04N 7/18* (2006.01)
*B60R 1/02* (2006.01)
(Continued)

(52) U.S. Cl.
CPC .............. *B60R 1/02* (2013.01); *B60R 1/00* (2013.01); *B60R 1/04* (2013.01); *B60R 1/12* (2013.01);
(Continued)

(58) Field of Classification Search
None
See application file for complete search history.

(56) References Cited

U.S. PATENT DOCUMENTS

| 4,713,685 A | 12/1987 | Nishimura et al. |
| 5,576,843 A * | 11/1996 | Cookson ................. G09B 5/04 348/E5.111 |

(Continued)

FOREIGN PATENT DOCUMENTS

| EP | 0 986 254 A1 | 3/2000 |
| EP | 2 042 374 A2 | 4/2009 |

(Continued)

OTHER PUBLICATIONS

Chinese Office Action dated Mar. 17, 2016 as received in corresponding Chinese Application No. 201380022999.3 and its English translation thereof.
(Continued)

*Primary Examiner* — James M Anderson, II
(74) *Attorney, Agent, or Firm* — Foley & Lardner LLP (57) ABSTRACT

[Problem] To provide a vehicle rearview mirror system which is capable of eliminating a circumstance that a driver feel a sense that something is wrong, even in a case where a screen of a display device is caused to one-to-one correspond with an aspect ratio of the vehicle rearview mirror, and the ratio of the display screen of the display device is made different from an aspect ratio of an image which is acquired by a vehicle-mounted camera.
[Means for Solving the Problem] A vehicle rearview mirror system of the present invention has: a display device 9 to construct an image by an image signal having been output from an image receiving unit 2a of a vehicle-mounted camera 2 and then cause a display screen 9a to display the constructed image; and a vehicle mirror main body 3 in which the display device 9 is incorporated. A ratio between (Continued)

a width in a transverse direction and a width in a longitudinal direction of the screen 9a of the display device 9 is caused to one-to-one correspond to a ratio between a width in a transverse direction and a width in a longitudinal direction of the vehicle mirror main body 3, The display device 9 has a signal processing unit 11 which processes an image signal and then causes the display screen 9a to display a resultant image. Partway of a signal line SL between the image receiving unit 2a and the signal processing unit 11, there is provided an image signal clipping unit 17 to clip an image signal corresponding to an image portion which is unrequired for driving by the driver 4 from an image constructed by the image signal having been output from the image receiving unit 2a and then output the remaining image signals to the signal processing unit 11, The signal processing unit 11 constructs an image G1' of a ratio one-to-one corresponding to a ratio of the display screen 9a by a remaining image signal having been input.

9 Claims, 10 Drawing Sheets (51) Int. Cl.
  *B60R 1/00* (2006.01)
  *B60R 1/04* (2006.01)
  *B60R 1/12* (2006.01)
(52) U.S. Cl.
  CPC ............... *B60R 2001/1253* (2013.01); *B60R 2300/8026* (2013.01); *B60R 2300/8066* (2013.01)

(56) References Cited

U.S. PATENT DOCUMENTS

| 2002/0003571 | A1* | 1/2002 | Schofield | B60C 23/00 348/148 |
| 2007/0165108 | A1 | 7/2007 | Yuasa et al. | |
| 2011/0267366 | A1 | 11/2011 | Ichinose | |
| 2012/0154591 | A1* | 6/2012 | Baur | B60R 1/00 348/148 |

FOREIGN PATENT DOCUMENTS

| EP | 2042374 A2 * | 4/2009 | ............... B60R 1/00 |
| JP | 03-028947 U | 3/1991 | |
| JP | 2008-004990 A | 1/2008 | |
| JP | 2010-176087 A | 8/2010 | |
| JP | 2010-176087 A | 8/2010 | |
| JP | 2010-210324 A | 9/2010 | |
| JP | 2010-219587 A | 9/2010 | |
| WO | WO-03/105099 A1 | 12/2003 | |
| WO | WO 2010/050012 A1 | 5/2010 | |

OTHER PUBLICATIONS

Japanese Office Action dated Mar. 29, 2016 as received in corresponding Japanese Application No. 2012-117457 and its English translation thereof.
Chinese Office Action dated Nov. 30, 2016 as received in corresponding Chinese Application No. 201380022999.3 and its English translation thereof.
Japanese Office Action dated Oct. 4, 2016 as received in corresponding Japanese Application No. 2012-117457 and its English translation thereof.

* cited by examiner

VEHICLE REARVIEW MIRROR SYSTEM, AND VEHICLE PROVIDED WITH SAID VEHICLE REARVIEW MIRROR SYSTEM

TECHNICAL FIELD

The present invention relates to a vehicle rearview mirror system and a vehicle provided with the vehicle rearview mirror system.

BACKGROUND ART

Conventionally and up to now, in a vehicle rearview mirror system, it has been known that there is provided a construction in which a liquid crystal display device is provided inside of a vehicle mirror main body, an image acquired by a vehicle-mounted camera is displayed on the liquid crystal display device, and the displayed image can be visually recognized by a driver through a half mirror provided on a front face of the vehicle mirror main body. (Refer to Patent Literature 1, for example.).

CITATION LIST

Patent Literature

[Patent Literature 1] Japanese Utility Model Application Publication No. 03-28947

SUMMARY OF THE INVENTION

Problems to be Solved by the Invention

Incidentally, in so far as an aspect ratio of an image which is acquired by a vehicle-mounted camera is concerned, for example, while an aspect ratio between a width in a transverse direction (a width H in a horizontal direction) and a width in a longitudinal direction (a width V in a vertical direction is 4:3, a vehicle mirror main body is generally elongated, that is, the horizontal direction is longer than the vertical direction, and the aspect ratio is made different from the aspect ratio of the image that is acquired by the car-mounted camera.

As a result, assuming that: a liquid crystal display screen of a liquid crystal display device is constructed in such a manner as to be caused to correspond to the aspect ratio of the vehicle mirror main body; an object is acquired by the car-mounted camera; the image signal is input to the liquid crystal display device as is; and then the input signal is displayed on the liquid crystal display screen, an image which is collapsed and distorted in the longitudinal direction (the vertical direction) is obtained.

Thus, if the image which is displayed on the liquid crystal display screen through the half mirror is visually recognized, the resultant image is significantly different in comparison with a case in which an object appearing in the half mirror is seen, and may make a driver feel a sense that something is wrong.

The present invention has been made in view of the circumstance mentioned above, and it is an object of the present invention to provide a vehicle rearview mirror system which is capable of eliminating a circumstance that a driver feels a sense that something is wrong, even in a case where a display screen of a display device is caused to one-to-one correspond to the aspect ratio of the vehicle rearview mirror, and is made different from the aspect ratio of the image that is acquired by the car-mounted camera.

Means for Solving the Problem

A vehicle rearview mirror system of the present invention has: a display device to construct an image by an image signal having been output from an image receiving unit of a car-mounted camera and then cause a display screen to display the constructed image; and a vehicle mirror main body in which the display device is incorporated. An aspect ratio in a width in a transverse direction and a width in a longitudinal direction on the display screen of the display device is caused to one-to-one correspond to an aspect ratio in a width in a transverse direction and a width in a longitudinal direction of the vehicle mirror main body.

The display device has a signal processing unit to process an image signal and then cause the display screen to display a resultant image, and partway of a signal line between an image receiving unit and a signal processing unit, there is provided an image signal clipping unit to clip an image signal corresponding to an image portion which is unrequired for driving by a driver from the image that is constructed by the image signal having been output from the image receiving unit and then output the remaining image signal to the signal processing unit. The signal processing unit constructs an image of an aspect ratio one-to-one corresponding to the aspect ratio of the display screen by way of the remaining image signals having been input.

Effect of the Invention

According to the present invention, in a case where an image is constructed by employing an image signal having been output from a vehicle-mounted camera and then the constructed image is visually recognized by a driver, it is possible to eliminate production of an image which is collapsed in a vertical direction, and as a result, there is attained an advantageous effect that it is possible to eliminate a circumstance that a driver feels a sense that something is wrong when the driver watches the thus recognized image.

BRIEF DESCRIPTION OF THE DRAWINGS

FIG. 5 is an illustrative view for illustrating a failure exerted by a difference between an aspect ratio of an image which is constructed by an image signal having been output from an image receiving unit shown in FIG. 4 and an aspect ratio of a liquid crystal display screen shown in FIGS. 2 and 3, wherein FIG. 5(a) is an illustrative view illustrating the aspect ratio of the image that is constructed by the image signal having been output from the image receiving unit, FIG. 5(b) is an illustrative view of the aspect ratio of the liquid crystal display screen shown in FIGS. 2 and 3, FIG. 5(c) is an illustrative view illustrating a failure when the image signal having been output from the image receiving unit is employed as it is, and an image is displayed on the liquid crystal display screen, and FIG. 5(d) is an illustrative view in a case of converting the aspect ratio of the image that is constructed by the image signal having been output from the image receiving unit and displaying a resultant image of the converted aspect ratio on the liquid crystal display screen.

FIG. 6 is an illustrative view conceptually showing conversion of the aspect ratio, wherein FIG. 6(a) is an illustrative view in a case where an attempt is made to carry out conversion of an aspect ratio while clipping an upper image portion which is unrequired to be seen at the time of driving from the image that is constructed by the image signal having been output from the image receiving unit of the vehicle-mounted camera. FIG. 6(b) is an illustrative view in a case where an attempt is made to carry out conversion of an aspect ratio while clipping a lower image portion which is unrequired to be seen at the time of driving from the image that is constructed by the image signal having been output from the image receiving unit of the vehicle-mounted camera, and FIG. 6(c) is an illustrative view in a case where an attempt is made to carry out conversion of an aspect ratio while clipping an upper unit and a lower image portions which are unrequired to be seen at the time of driving from the image that is constructed by the image signal having been output from the image receiving unit of the vehicle-mounted camera.

FIG. 8 is an illustrative view showing a relationship between an analog signal, a scanning line, and an aspect ratio which are output from the image receiving unit shown in FIG. 7, and are employed to construct an image of one field, wherein FIG. 8(a) is an illustrative view showing a relationship between an analog signal and a scanning line which are output from the image receiving unit shown in FIG. 7, employed to construct an image of one field, FIG. 8(b) is an illustrative view showing a failure in a case of forming an image on a liquid crystal display screen by scanning lines, the number of which is the same as that of scanning lines which are employed to construct the image of such one field, FIG. 8(c) is an illustrative view showing a state of, among analog signals which are output from the image receiving unit, and are employed to construct the image of such one field, discarding analog signals corresponding to less than a first predetermined number of scanning lines from a first scanning line and discarding a second predetermined number of and subsequent scanning lines by employing analog signals from the first predetermined number of scanning lines to the second predetermined number of scanning lines, and FIG. 8(d) is an illustrative view showing a state of constructing an image corresponding to an aspect ratio of a liquid crystal display screen of a liquid crystal display device by the analog signals from the first predetermined number to the second predetermined number.

MODE FOR CARRYING OUT THE INVENTION

[Embodiments]

Figure 1:
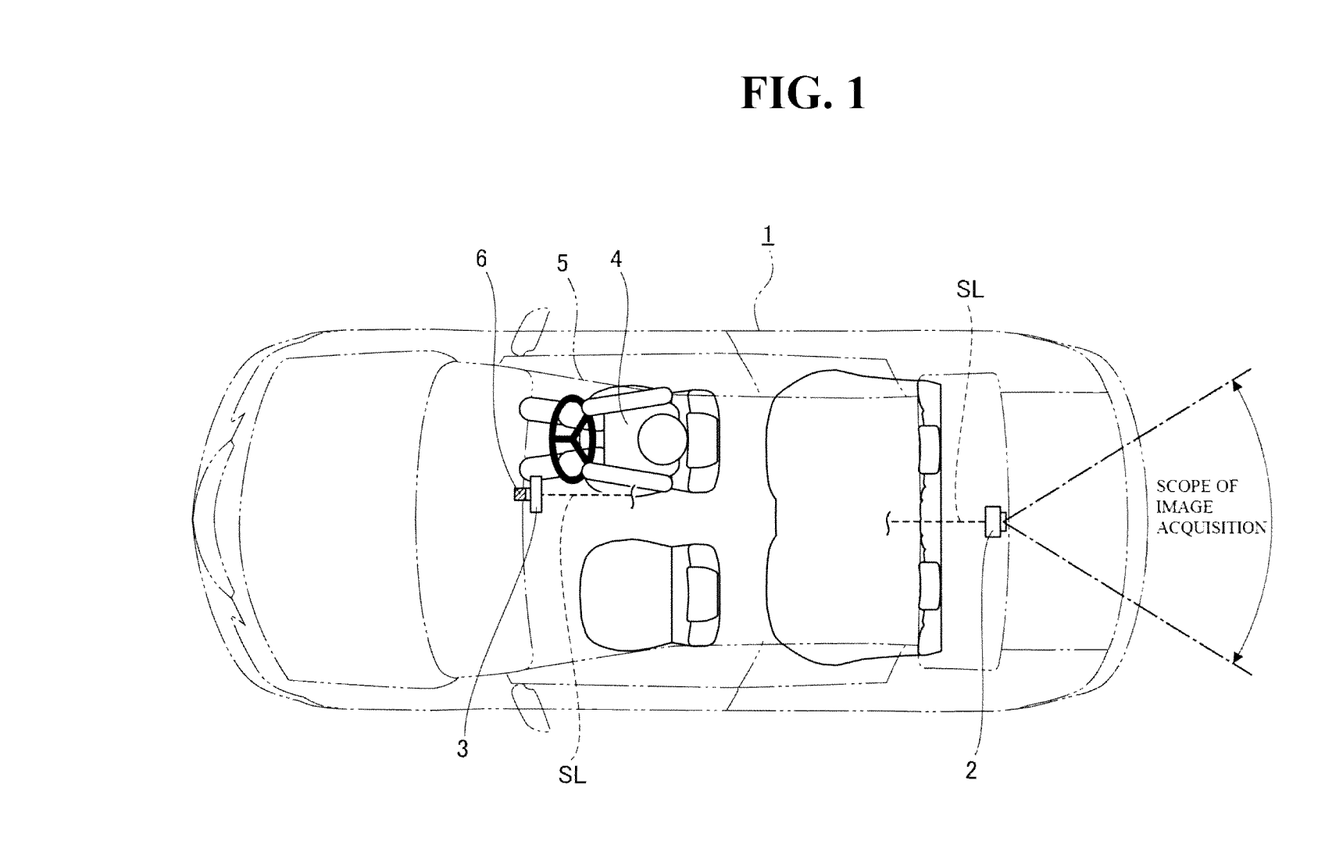
FIG. 1 is a plan view when a vehicle provided with a vehicle rearview mirror system according to the present invention is seen from a top side.

Embodiments of a vehicle rearview mirror system according to the present invention will be described with reference to the drawings. FIG. 1 is a plan view when a vehicle provided with a vehicle rearview mirror system according to the present invention is seen from a top side. In FIG. 1, reference numeral 1 designates a vehicle, reference numeral 2 designates a vehicle-mounted camera, reference numeral 3 designates a vehicle mirror main body, and reference numeral 4 designates a driver.

A vehicle-mounted camera 2 is installed in a vehicle 1 so as to be able to acquire an object on a vehicle rear side. A vehicle mirror main body 3 is supported via a support arm member which will be described later, in front of a driver 4 and at an appropriate site of a ceiling 5.

(Construction of Vehicle Mirror Main Body 3)

Figure 2:
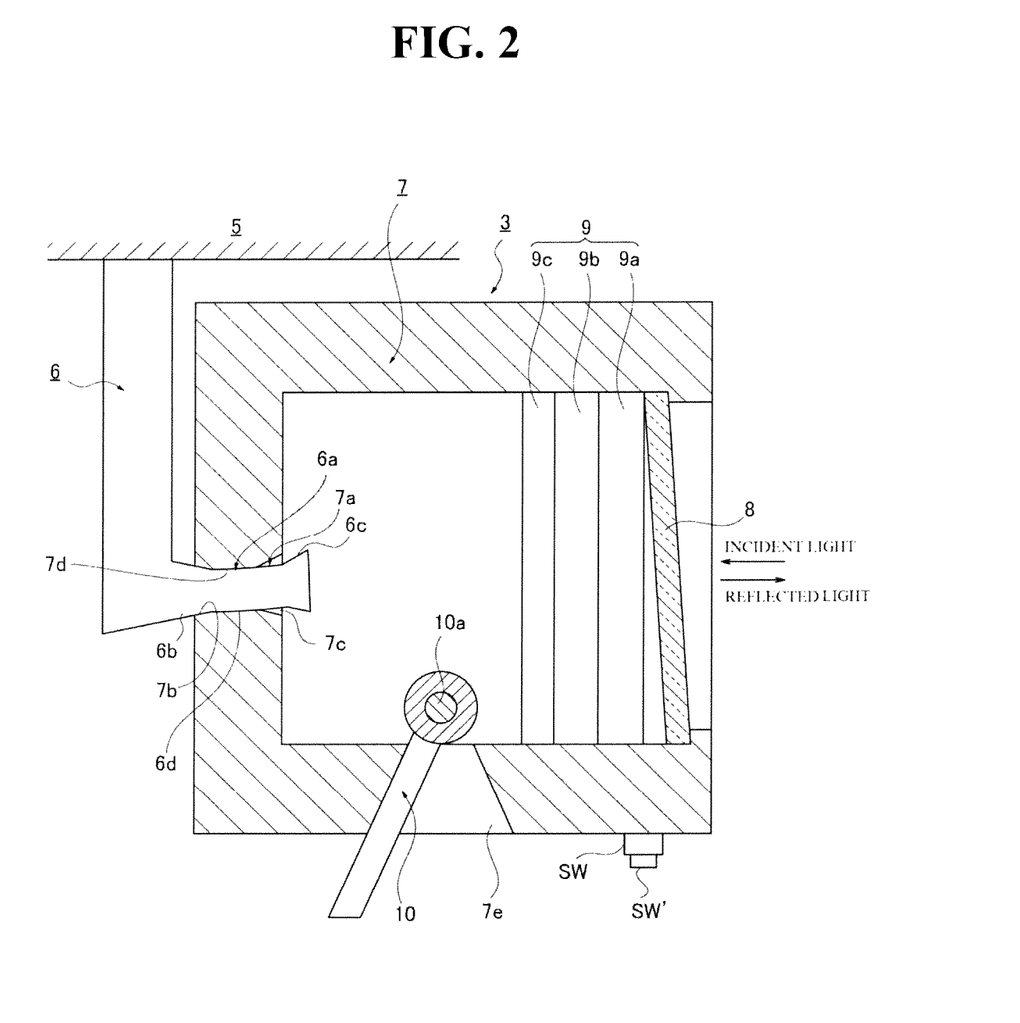
FIG. 2 is a schematic view showing a schematic construction of a vehicle mirror main body shown in FIG. 1, and is also a view showing a posture of the vehicle mirror main body when a driver watches a vehicle rear side appearing in a half mirror.
Figure 3:
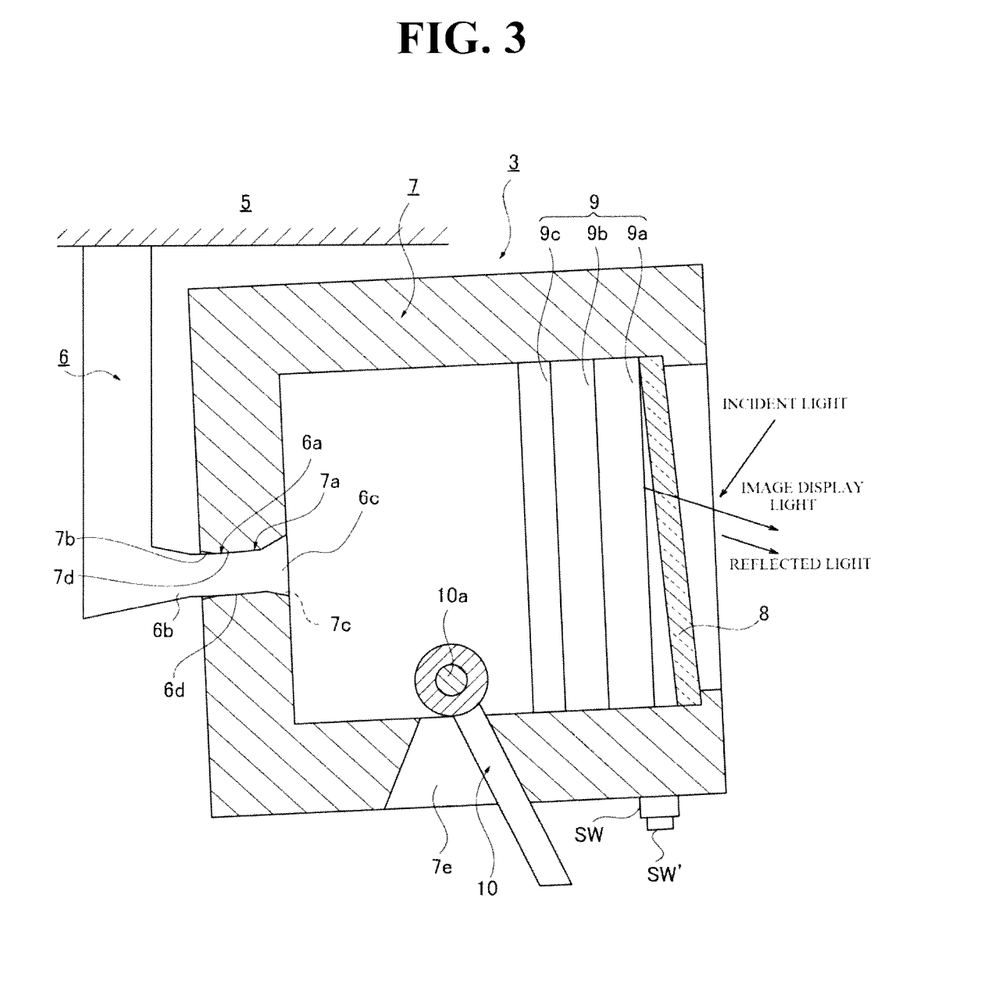
FIG. 3 a schematic view showing a schematic construction of a vehicle mirror main body shown in FIG. 1, and is also a view showing a posture of the vehicle mirror main body when a driver watches an image which is displayed on a liquid crystal display screen of a liquid crystal display device.

On the ceiling 5, as shown in FIGS. 2 and 3, a support arm member 6 extending toward a vertical lower side is provided. The support arm member 6 has a support unit 6a extending in a horizontal direction.

At a tip end part and a rear end part of this support unit 6a, a tapered stopper units 6b, 6c are formed. Between a stopper unit 6b and a stopper unit 6c of the support unit 6a, a curved unit 6d having a predetermined curvature is formed.

The vehicle mirror main body 3 has a casing 7 extending in a transverse direction (a horizontal direction). On a rear wall of the casing 7, engagement holes 7a are formed. The engagement holes 7a are made of: engagement holes 7b, 7c corresponding to a shape of the stopper unit 6b of the support unit 6a; and an engagement hole 7d having a curvature corresponding to the curved unit 5d. The support unit 6a and the engagement hole 7a are engaged with each other at an appropriate frictional force, and this frictional force is defined to an extent such that a posture of the vehicle mirror main body 3 does not alter.

It is to be noted that FIGS. 2 and 3 schematically show support for the support arm member 6 of the vehicle mirror main body 3, a support structure thereof is not limitative thereto, and a contrivance can be appropriately made for assembling with the support unit 6a of the vehicle mirror main body 3.

On a front wall of the casing 7, an opening is formed, and in the opening, a flat and rectangular half mirror 8 is provided. In the vicinity of the half mirror 8, a liquid crystal display device 9 as a display device is provided. The liquid crystal display device 9 is provided as one unit, reference numeral 9a designates a liquid crystal display screen as a display screen, reference numeral 9b designates a backlight illumination unit, and reference numeral 9c designates an electric circuit board portion. A circuit construction of the liquid crystal display device 9 will be described later.

An aspect ratio between a width in a transverse direction and a width in a longitudinal direction of the casing 7 one-to-one corresponds to an aspect ratio of a liquid crystal display screen 9a of a liquid crystal display device 9, and this aspect ratio also one-to-one corresponds to an aspect ratio between a width in a transverse direction and a width in a longitudinal direction of the half mirror 8.

The half mirror 8 is capable of transmitting image display light from the liquid crystal display screen 9a of the liquid crystal display device 9, and is employed to cause the driver 4 to visually recognize a vehicle rear side. Inside of the casing 7, an operating lever member 10 is provided.

The operating lever member 10 is turnable in a forward and backward direction about a turning shaft 10a. On a lower wall of the casing 7, an elongated hole 7e extending in a forward and backward direction is formed. The operating lever member 10 extends toward a lower side, and a lower end part thereof is exposed to the outside of the casing 7 through the elongated hole 7e.

The operating lever member 10 is brought into sliding contact with a circumferential wall of the elongated hole 7c at an appropriate frictional force, and in the operating lever member 10, a posture thereof is retained at a turning operation position thereof by the frictional force exerted by the circumferential wall of the elongated hole 7e.

FIG. 2 shows an inclined posture of the vehicle mirror main body 3 when the driver 4 watches a vehicle rear side appearing in the half mirror 8, and FIG. 3 shows an inclined posture of the vehicle mirror main body 3 when the driver 4 watches an image which is displayed on the liquid crystal display screen 9a of the liquid crystal display device 9.

When the driver 4 handles the operating lever member 10 and then operates the operating lever member 10 in a direction approaching the driver 4, the casing 7 is moved along the curved unit 6d of the support unit 6a, and by this operation, the vehicle mirror main body 3 is inclined at a posture such that the driver 4 can watch the image which is displayed on the liquid crystal display screen 9a through the half mirror 8 from the posture shown in FIG. 2 when the driver 4 watches the vehicle rear side, and further, in this state, the inclined posture is retained. The inclined angle is about 5 degrees.

The half mirror 8 is disposed in the casing 7 at a slightly inclined angle with respect to the liquid crystal display screen 9a, whereby, when the vehicle mirror main body 3 is retained at the inclined posture shown in FIG. 3, reflected light (disturbance light), which is reflected by the half mirror 8, is less oriented to the driver 4.

Therefore, in a case where an attempt is made to check a rear side by employing the liquid crystal display device 9, as shown in FIG. 3, the vehicle mirror main body 3 is retained at the inclined posture so that the ceiling 5 appears, whereby it is possible to avoid incidence of bright disturbance light from the rear side to the eyes of the driver 4, and it is also possible to improve visual recognition of the image that is displayed on the display screen 9a of the liquid crystal display device 9.

It is to be noted that, although the operating lever member 10 is constructed to be turnable with respect to the casing 7, the operating lever member 10 may be constructed to be secured to the casing 7 without being limitative thereto.

(First Embodiment)

Figure 4:
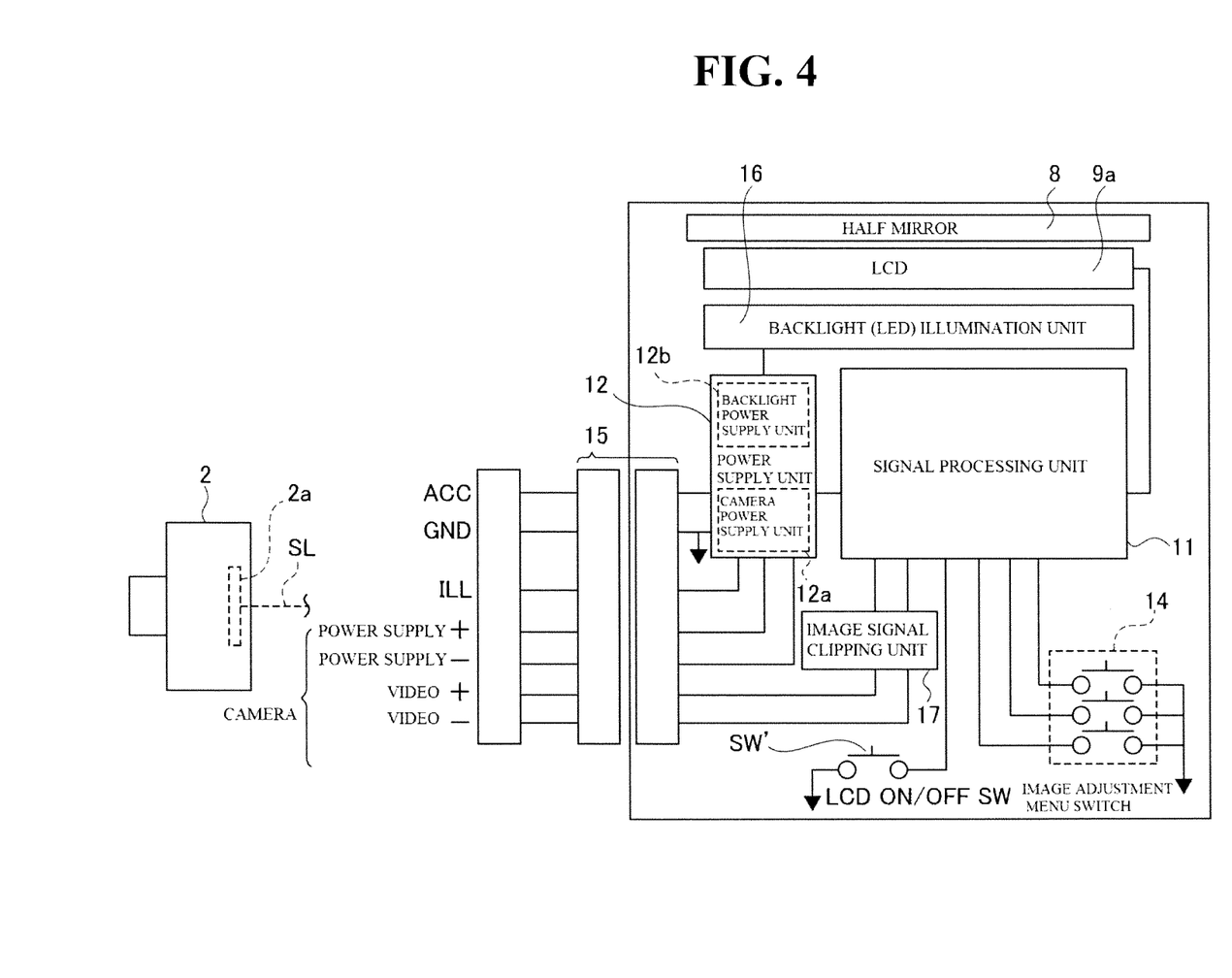
FIG. 4 is a block diagram showing a circuit construction of the liquid crystal display device according to a first embodiment of the vehicle rearview mirror system according to the present invention.

The liquid crystal display device 9, as shown in FIG. 4, is substantially composed of: a signal processing unit II to process an image signal having been output from the image receiving unit 2a of the vehicle-mounted camera 2 and then cause the liquid crystal display screen 9a to display a resultant image; a power supply unit 12; an image adjustment menu switch 14; a connector portion 15; a backlight illumination unit (an LED illumination unit) 16; and an LCD ON/OFF switch SW. These electric circuit constituent elements are arranged on an electric circuit board portion 9c. It is to be noted that an image acquisition element such as publicly known CCD is employed for the image receiving unit 2a.

At an input side of the connector portion 15, there are provided: an alternating current power supply terminal ACC; a ground terminal GND; a ILL terminal; a positive terminal for power supply; a negative terminal for power supply; a positive input terminal for image acquisition signal; and a negative input terminal for image acquisition signal.

The ILL terminal, the power supply positive terminal, and the power supply negative terminal are electrically connected to the vehicle-mounted camera 2 via a power supply feeding line (not shown), and the positive input terminal for image acquisition signal and the negative input terminal for image acquisition signal are electrically connected to the image receiving unit 2a of the vehicle-mounted camera 2 via a signal line SL. It is to be noted that the power supply unit 12 is composed of a camera power supply unit 12a and a backlight power supply unit 12b.

The LCD ON/OFF switch SW, here, as shown in FIGS. 2 and 3, is provided on a lower wall of the casing 7.

When an actuator unit SW' of the LCD ON/OFF switch SW is switched on, a voltage is applied from the alternating current power supply terminal ACC to the power supply unit 12, and from the power supply unit 12, power is supplied to the vehicle-mounted camera 2 and the backlight illumination unit 16, whereby the backlight illumination unit 16 is lit, and the vehicle-mounted camera 2 is switched on.

When the vehicle-mounted camera 2 is switched on, an image signal from the image receiving unit 2a is input to an image signal clipping unit 17 via the connector portion 15. Functions of the image signal clipping unit 17 will be described later. Although the image signal having been output from the image receiving unit 2a is an analog signal, this analog signal is converted to a digital signal by a publicly known AD/conversion circuit (not shown) in the vehicle-mounted camera 2, and the converted digital signal is output to the image signal clipping unit 17.

The image signal clipping unit 17 outputs an image signal to the signal processing unit 11 and the signal processing unit II applies predetermined processing to an input image signal and then outputs the resultant image to the liquid crystal display screen 9a.

In so far as the image of the liquid crystal display screen 9a is concerned, the intensity, hue, and color gradation or the like can be adjusted by the image adjustment menu switch 14.

Constructions of the signal processing unit 11, the power supply unit 12, the image adjustment menu switch 14, the connector portion 15, the backlight illumination unit 16, and the LCD ON/OFF switch SW can be employed as publicly known ones.

The image signal clipping unit 17 serves to clip an image signal corresponding to an image portion which is unrequired for driving by the driver 4 and then output to the signal processing unit 11 the remaining image signal from an image which is constructed by an image signal having been output from the image receiving unit 2a of the vehicle-mounted camera 2, Here, the image signal clipping unit 17 is composed of an image signal conversion block portion to which the image signal having been output from the image receiving unit 2a of the vehicle-mounted camera 2 is input, and which converts an aspect ratio in a longitudinal direction and a transverse direction to an aspect ratio of the liquid crystal display screen 9a and then outputs the converted aspect ratio to the signal processing unit 11 from the image that is constructed by the image signal having been output from the image receiving units 2a.

The signal processing unit 11 constructs an image of an aspect ratio one-to-one corresponding to an aspect ratio of the liquid crystal display screen 9a by a remaining image signal excluding the image signal that is clipped by the image signal clipping unit 17.

Figure 5:
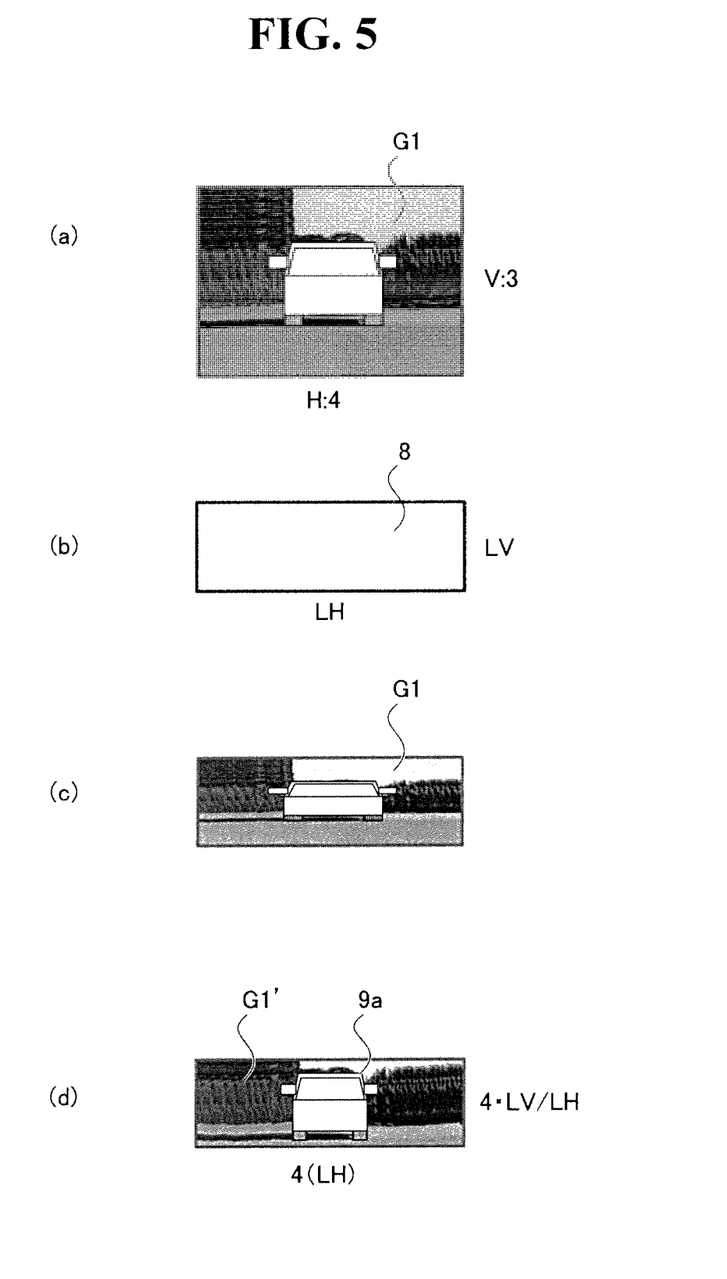

An aspect ratio in a width in a longitudinal direction and a width in a transverse direction of an image GI which is constructed by the image signal having been output from the image receiving unit 2a of the vehicle-mounted camera 2 is transverse 4: longitudinal 3, as shown in FIG. 5(a), for example. In contrary to this, the rectangular half mirror 8 is longer in transverse direction than in longitudinal direction, and as shown in FIG. 5(b), an aspect ratio between the width in the transverse direction and the width in the longitudinal direction is LH:LV.

Therefore, assuming that the image signal having been output from the image receiving unit 2a of the vehicle-mounted camera 2 is input to the signal processing unit 11 as it is, in place of providing the image signal clipping unit 17 and then the input signal is displayed on the liquid crystal display screen 9a, as shown in FIG. 5(c), the image G1 is produced as an image having been collapsed and distorted in a longitudinal direction.

On contrary to this, assuming that: the image signal clipping unit 17 is composed of an image signal conversion unit; the aspect ratio of the image G1 is converted to the aspect ratio of the liquid crystal display screen 9a, that is, 4:4 (LV/LH) by the image signal conversion unit; and then a resultant image of the converted aspect ratio is clipped, as shown in FIG. 5(d), it is possible to prevent the image G1 (refer to FIG. 5(c) from appearing as the image G1' having been collapsed and distorted in the longitudinal direction.

Figure 6:
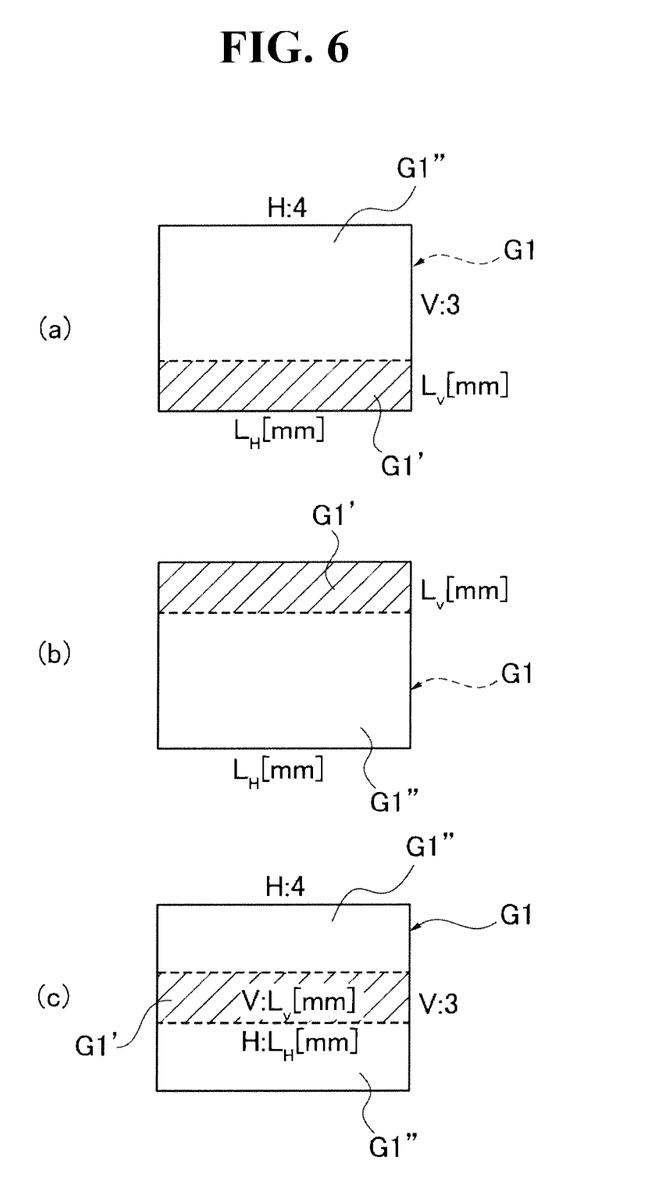

FIG. 6 shows an example of clipping the image G1 that is constructed by the image signal having been output from the image receiving unit 2a, wherein FIG. 6(a) shows a schematic view of a construction of clipping an image portion G1" which is unrequired for driving by the driver 4 from the image G1 and then causing the liquid crystal display screen to display an remaining image G1'.

Also, FIG. 6(b) is a view of a construction of clipping a lower image portion G1" which is unrequired for driving by the driver 4 from the image G1 that is constructed by the image signal having been output from the image receiving unit 2a and then causing the liquid crystal display screen 9a to display a remaining image G1', and FIG. 6(c) is a view of a construction of clipping upper and lower image portions G1", G1" which are unrequired for driving by the driver 4 from the image G1 that is constructed by the image signal having been output from the image receiving unit 2a and then causing the liquid crystal display screen 9a to display the remaining image G1'.

Of the image G1 that is acquired by the vehicle-mounted camera 2, a sky substantially appears at the upper image portions of the image G1, and even if these image portions are not displayed on the liquid crystal display screen 9a, no problem will arise in driving by the vehicle 2.

Of the image G1 that is acquired by the vehicle-mounted camera 2, a road or the like which is substantially distant from the vehicle 2 appears at the lower image portions of the image G1, and even if these image portions are not displayed on the liquid crystal display screen 9a, no problem will arise in driving by the vehicle 2.

As shown in FIG. 6(c), as long as there is employed a construction of clipping the upper and lower image portions G1" which are unrequired for driving by the driver 4 from the image G1 that is acquired by the vehicle-mounted camera 2, converting an aspect ratio of the image that is acquired by the car-mounted camera 2 to an aspect ratio of the liquid crystal display screen 9a and then causing the liquid crystal display screen 9a to display the image G1' that is acquired by the vehicle-mounted camera 2, it is possible to avoid production of a vertically collapsed and distorted image while avoiding display of information which is unrequired for driving by the driver 4.

(Second Embodiment)

Figure 7:
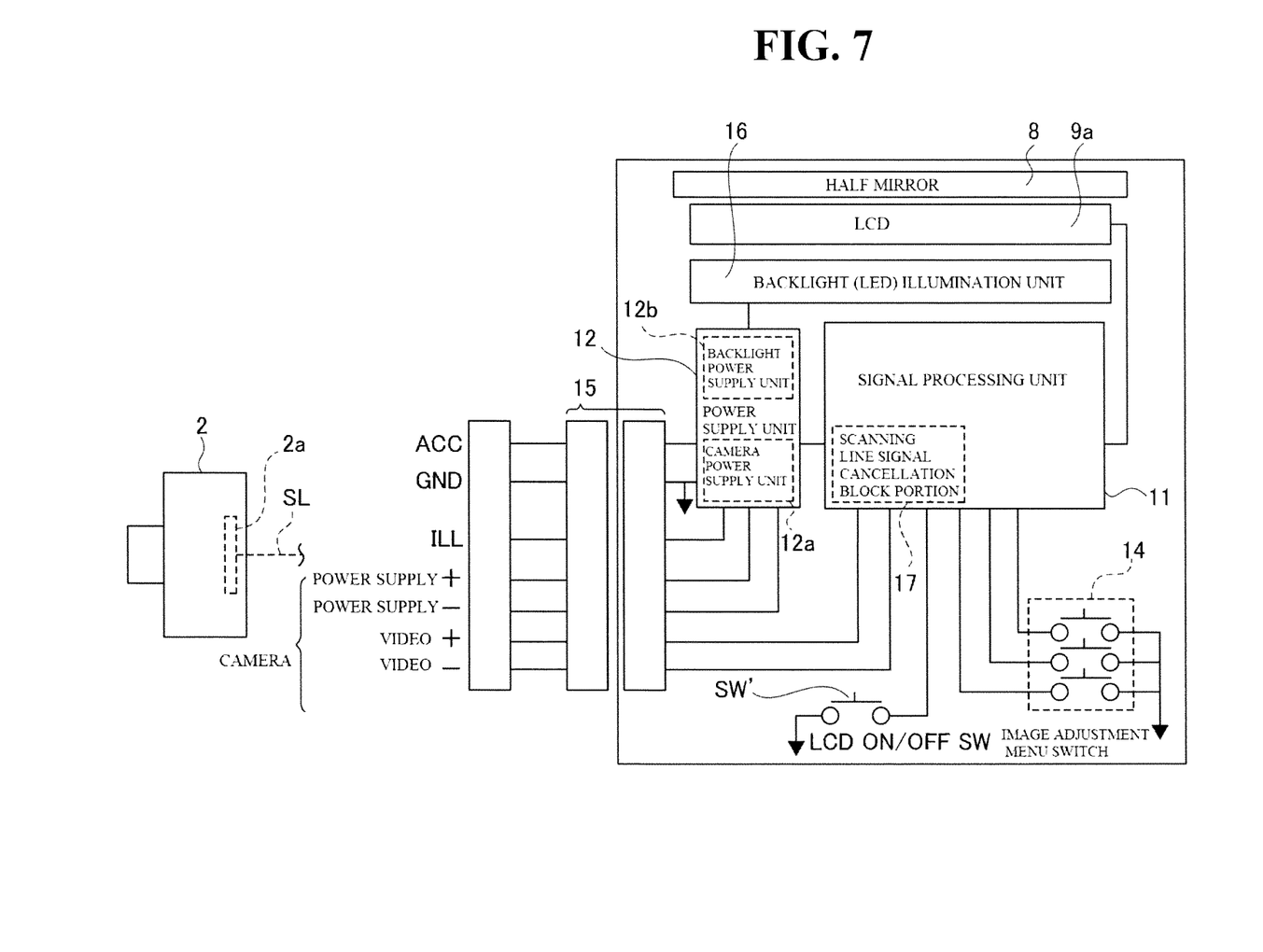
FIG. 7 is a block diagram showing a circuit construction of a liquid crystal display device according to a second embodiment of the vehicle rearview mirror system according to the present invention.

FIG. 7 is a block diagram showing a circuit construction of a liquid crystal display device according to a second embodiment, of a vehicle rearview mirror system of the present invention.

In the second embodiment, the image signal clipping unit 17 is composed of a scanning line signal cancellation circuit (an image signal cancellation circuit). It is to be noted that in the embodiment, although the scanning line signal cancellation circuit is incorporated in the signal processing unit 11, the circuit is not limitative thereto.

Figure 8:
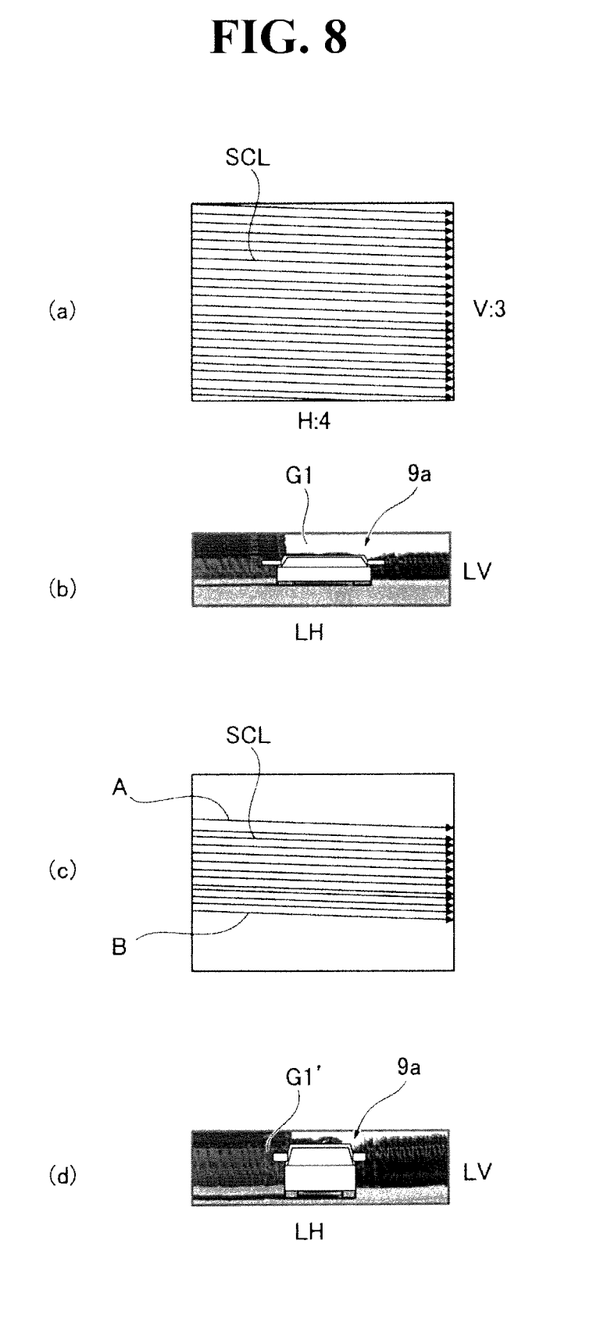

From the image receiving unit 2a, an analog signal (a composite signal, a composite video signal) is output as an image signal employed to construct an image of one field corresponding to an aspect ratio (H=4:V=3) shown in FIG. 8(a).

The number of scanning lines SCL employed to construct the image of such one field is 252.5 lines, for example (525 lines in one frame). Assuming that the image G1 is displayed on the liquid crystal display screen 9a of which an aspect ratio is LH:LV by employing the 252.5 scanning lines SCL as they are, an image with the image G1 being collapsed in a longitudinal direction is obtained as shown in FIG. 8(b).

In the second embodiment, as shown in FIG. 8(c), in so far as the scanning line signal cancellation circuit is concerned, among the analog signals having been output from the image receiving unit 2a and employed to construct the image G1 of one field, analog signals corresponding to less than a first predetermined number of scanning lines (an A-th scanning line) from a first scanning line of the scanning lines SCL are discarded, and analog signals of a second predetermined number of scanning lines (a B-th scanning line) and subsequent scanning lines are discarded by employing analog signals from the first predetermined number of scanning lines (the A-th scanning line) to the second predetermined number of scanning lines (the B-th scanning line).

The analog signals corresponding to the scanning lines SCL from the first predetermined number of scanning lines (the A-th scanning line) to the second predetermined number of scanning lines (the B-th scanning line) are routed through the scanning line signal cancellation circuit, and the thus routed analog signal are guided to the signal processing unit 11.

The signal processing unit 11 constructs the image G1' corresponding to the aspect ratio of the liquid crystal display screen 9a by the analog signals corresponding to the scanning lines SCL from the first predetermined number of scanning lines (the A-th scanning line) to the second predetermined number of scanning lines (the B-th scanning line).

Although in the foregoing embodiment, the image signal clipping unit 1 is provided integrally with the liquid crystal display device 9, the image signal clipping unit 17 may be provided partway of the signal line L between the vehicle-mounted camera 2 and the liquid crystal display device 9, or alternatively, the image signal clipping unit 17 may be constructed to be provided integrally with the vehicle-mounted camera 2 without being limitative thereto.

(Third Embodiment)

Figure 9:
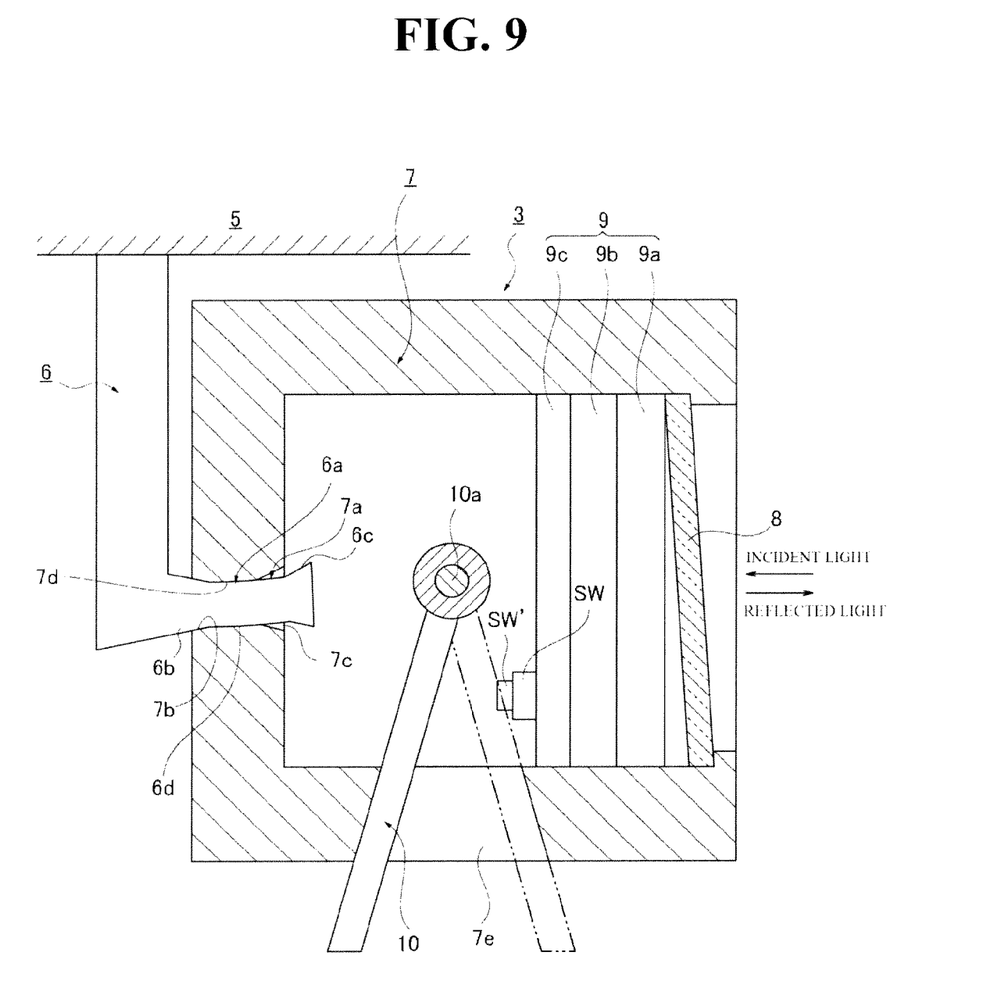
FIG. 9 is an illustrative view of a third embodiment of the vehicle rearview mirror system according to the present invention, and is also a schematic view showing a state before inclining a vehicle mirror main body, and further is a view showing a posture of the vehicle mirror main body when a driver watches a vehicle rear side appearing in a half mirror.
Figure 10:
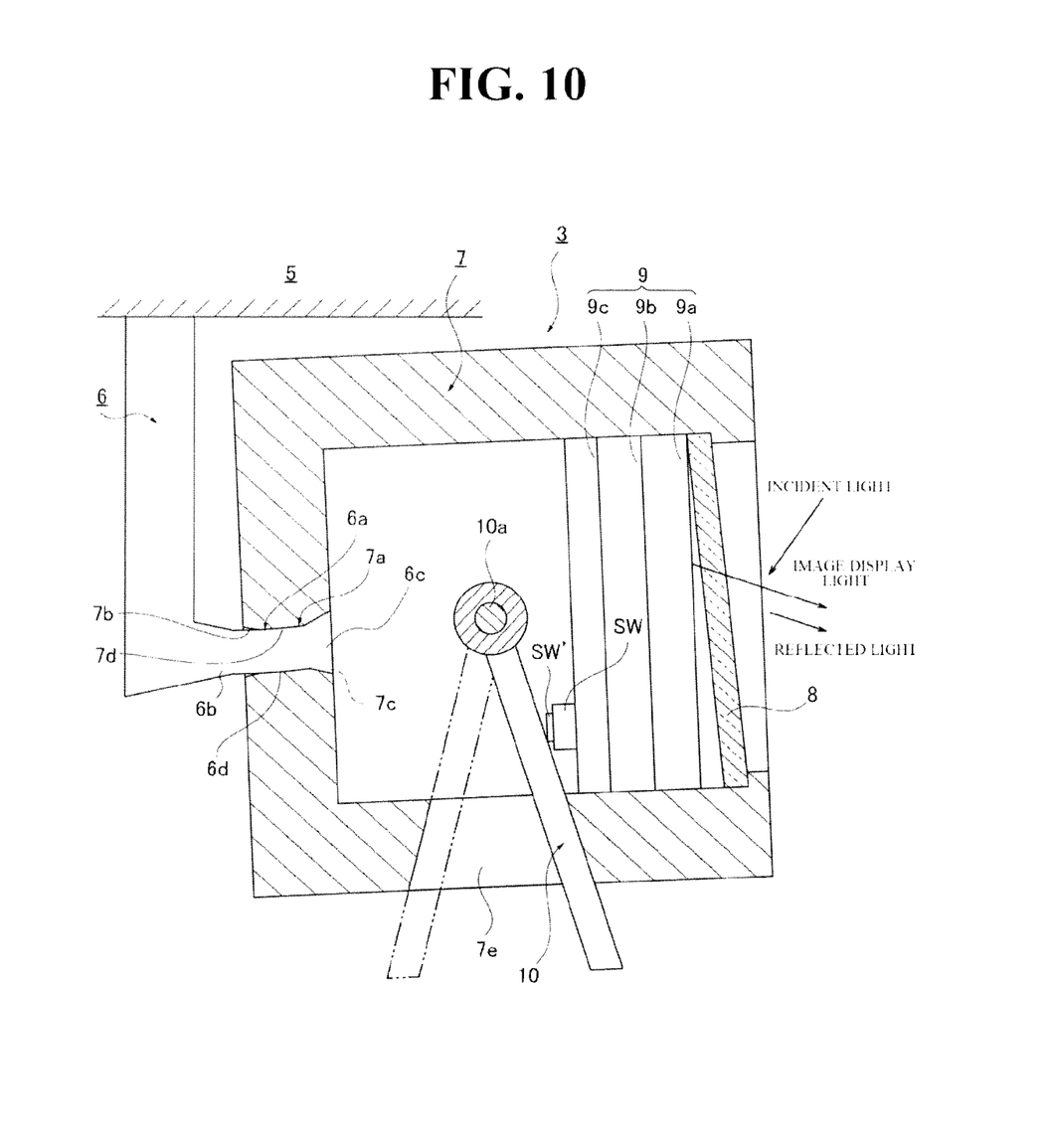
FIG. 10 is a view showing a posture of a vehicle mirror main body when a driver watches an image which is displayed on a liquid crystal display screen of a liquid crystal display device while the vehicle mirror main body shown in FIG. 9 is inclined

FIGS. 9 and 10 show a third embodiment of the vehicle rearview mirror system according to the present invention, and in the third embodiment, the LCD ON/OFF switch SW is provided on the electric circuit board portion 9c.

An actuator unit SW' of the LCD ON/OFF switch SW is provided to be seen in a turning region of the operating lever member 10, and as shown in FIG. 10, if the operating lever member 10 abuts against the LCD ON/OFF switch SW, the liquid crystal display device 9 is switched on, and further, as shown in FIG. 9, if the operating lever member 10 is spaced therefrom, the liquid crystal display device 9 is turned OFF.

According to the third embodiment, since the liquid crystal display device 9 is switched on or off in conjunction with operation of the operating lever member 10, operability is improved more remarkably than the liquid crystal display device 9 of the first and second embodiments.

The invention claimed is:

1. A vehicle rearview mirror system comprising:
a display device to construct an image by an image signal having been output from an image receiving unit of a vehicle-mounted camera and then cause a display screen of the display device to display the constructed image; and
a vehicle mirror main body in which the display device is incorporated,
wherein an aspect ratio of the display device between a width in a transverse direction and a width in a longitudinal direction thereof is caused to one-to-one correspond to an aspect ratio of the vehicle mirror main body between a width in a transverse direction and a width in a longitudinal direction thereof,
the display device has a signal processing unit which processes the image signal to construct the image and then causes the display screen to display the constructed-image,
partway of a signal line between the image receiving unit and the signal processing unit, there is provided an image signal clipping unit to clip an image signal corresponding to an image portion which is unrequired for driving by a driver from the image signal having been output from the image receiving unit and then output the image signal other than the clipped image signal to the signal processing unit, and
the signal processing unit constructs an image of an aspect ratio one-to-one corresponding to the aspect ratio of the display screen to which the aspect ratio of the vehicle mirror main body one-to-one corresponds, from the image signal output from the image signal clipping unit.

2. The vehicle rearview mirror system according to claim 1,
wherein a rectangular half mirror which is capable of transmitting and visually recognizing the image that is displayed on the display screen of the display device is provided at the vehicle mirror main body, and
an aspect ratio of the half mirror between a width in a transverse direction and a width in a longitudinal direction thereof one-to-one corresponds to the aspect ratio of the display screen of the display device.

3. The vehicle rearview mirror system according to claim 2,
wherein the image signal clipping unit is composed of an image signal conversion unit to which the image signal having been output from the image receiving unit is input, and which converts an aspect ratio between a longitudinal direction and a transverse direction to the aspect ratio of the display screen from the image that is constructed by the image signal having been output from the image receiving unit and then outputs the converted aspect ratio to the signal processing unit.

4. The vehicle rearview mirror system according to claim 1,
wherein the image signal having been output from the image receiving unit is an analog signal and the analog signal is converted to a digital signal and then the converted digital signal is input to the signal processing unit.

5. The vehicle rearview mirror system according to claim 1,
wherein the image signal having been output from the image receiving unit is an analog signal,
the image signal clipping unit is composed of an image signal cancellation circuit to discard analog signals corresponding to less than a first predetermined number of scanning lines from a first scanning line and then output analog signals from the first predetermined number of scanning lines to a second predetermined number of scanning lines to the signal processing unit, and further, discard analog signals of the second predetermined number of scanning lines and subsequent scanning lines from among analog signals having been output from the image receiving unit and employed to construct an image of one field, and
the signal processing unit constructs an image of an aspect ratio corresponding to the aspect ratio between the width in the transverse direction and the width in the longitudinal direction of the display screen of the display device by way of analog signals from the first predetermined number of scanning lines to the second predetermined number of scanning lines.

6. A vehicle comprising:
a vehicle room; and
the vehicle rearview mirror system of claim 2 provided in the vehicle room via a support arm,
wherein the vehicle mirror main body is inclinable between a posture when a driver watches the image which is displayed on the display screen of the display device and a posture when the driver watches a vehicle rear side appearing in the half mirror.

7. The vehicle rearview mirror system according to claim 1, wherein the image signal clipping unit is provided integrally with the display device.

8. The vehicle rearview mirror system according to claim 1, further comprising a vehicle-mounted camera, wherein the image signal clipping unit is provided integrally with the camera.

9. The vehicle according to claim 6, wherein an operating lever member which alters an inclined posture of the vehicle mirror main body is provided at the vehicle mirror main body, and the display device is switched on or off by operation of the operating lever member.

* * * * *